(12) United States Patent
Falchuk et al.

(10) Patent No.: US 8,488,522 B2
(45) Date of Patent: Jul. 16, 2013

(54) METHOD AND SYSTEM TO MANAGE WIRELESS COMMUNICATIONS OF HIGH-OCCUPANCY VEHICLES

(75) Inventors: Benjamin W. Falchuk, Upper Nyack, NY (US); Ming-Yee Lai, Short Hills, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 484 days.

(21) Appl. No.: 12/437,458

(22) Filed: May 7, 2009

(65) Prior Publication Data

US 2009/0279483 A1 Nov. 12, 2009

Related U.S. Application Data

(60) Provisional application No. 61/051,247, filed on May 7, 2008, provisional application No. 61/168,760, filed on Apr. 13, 2009.

(51) Int. Cl.
*H04W 4/00* (2009.01)
*H04M 1/00* (2006.01)

(52) U.S. Cl.
USPC ...................................... 370/328; 455/552.1

(58) Field of Classification Search
None
See application file for complete search history.

(56) References Cited

U.S. PATENT DOCUMENTS

| | | | |
|---|---|---|---|
| 6,763,371 B1* | 7/2004 | Jandel | 709/204 |
| 7,257,640 B1* | 8/2007 | Callocchia et al. | 709/233 |
| 2005/0090283 A1* | 4/2005 | Rodriquez | 455/552.1 |
| 2007/0167174 A1* | 7/2007 | Halcrow et al. | 455/456.2 |
| 2008/0316983 A1* | 12/2008 | Daigle | 370/338 |

OTHER PUBLICATIONS

International Search Report dated Jun. 19, 2009.

* cited by examiner

*Primary Examiner* — John Blanton
(74) *Attorney, Agent, or Firm* — Philip J. Feig

(57) ABSTRACT

A system and method for managing wireless communications for a plurality of devices in a high occupancy vehicle is presented. The method comprises steps of creating a global bandwidth usage map across all vehicles, routes, and passengers, transmitting the global bandwidth usage map to a vehicle controller, interpreting the global bandwidth usage map and creating a local usage map, and commanding a wireless concentrator to manage the wireless communications for the devices in accordance with the local usage map. Further, the global map can be created by gathering ticket and route information, obtaining customer productivity data from a network, and parsing obtained data into canonical form. A step of inputting the ticketing information by one of the user, and a ticketing agent can be included. A step of displaying messages using a wireless access application residing on the device can be included.

14 Claims, 7 Drawing Sheets

FIG. 3

Table: Ticketing info
Description: stores basic ticketing info
Cols:
- Route
- HOV ID
- Passenger
- Boarding location
- disembarking location
- price paid Table: Passenger Network Usage
Description: stores anticipated network usage info
Cols:
- Passenger
- Time period or location
- Anticipated bitrate required Table: Schedule
Description: stores route segments and metadata
Cols:
- Route
- HOV ID (the vehicle)
- Route Segment
- Location of stop
- Time/duration of stop
- Type of stop (REG, RESTSTOP, STN,...)

Table: Available capacity to HOV
Description: fed from NOP OSS, stores available capacity to a given HOV at RANs
Cols:
- NOP
- RAN_ID
- HOV vehicle in question
- Time period
- available capacity to HOV Virtual Table: Demand along route
Description: fed from NOP OSS, stores available capacity to a given HOV at RANs
Cols:
- HOV ID
- Route ID
- location
- cumulative bandwidth required

METHOD AND SYSTEM TO MANAGE WIRELESS COMMUNICATIONS OF HIGH-OCCUPANCY VEHICLES

CROSS REFERENCE TO RELATED APPLICATIONS

The present invention claims the benefit of U.S. provisional patent applications 61/051,247 filed May 7, 2008 and 61/168,760 filed Apr. 13, 2009, the entire contents and disclosure of which are incorporated herein by reference as if fully set forth herein.

FIELD OF THE INVENTION

The present invention relates generally to wireless communications. In particular, the invention concerns improving access to wireless services in high occupancy vehicles (HOVs).

BACKGROUND OF THE INVENTION

Continual access to wireless communication networks by mass-transit passengers while in transit is currently an emerging interest of bus, e.g. Greyhound, train, e.g. VIA Rail (Canada), airplane, and van-pool operators. Currently, in-vehicle broadband wireless services for passengers with mobile devices in HOVs, e.g., buses, car pool vans, trains, is limited to the radio coverage area of one or a few types of wireless wide area network(s) (WWAN), e.g., 2.5G networks like GPRS/EDGE/CDMA, 3G networks like EVDO/UMTS/HSDA, or 4G networks like WiMAX/LTE. This in-vehicle service suffers from poor service quality due to bandwidth capacity constraints along the route that the HOV travels. Indeed, the bandwidth requirement of HOV's can be a complicated function of the number of passengers and their cumulative bandwidth needs as a function of time and the current landscape of solutions does not systematically address anticipated passenger bandwidth requirements (as functions of scheduled and anticipated communications sessions) nor does it take into account HOV route as associated with Radio access networks.

In addition, the moving communicating HOV has large cumulative bandwidth requirements, e.g. bandwidth "sinks", wherever it currently is on its route and makes a significant impact on the network as a function of: place, time, and passenger activity. The available bandwidth for an HOV is affected by the radio bandwidth available at the stations serving the HOV, wherever that may be (as a function of time and place). Disregarding these factors can create unexpected problems for both network service providers (NSPs) and passengers. For example, NSPs may be unaware that the HOV—while far away presently—is heading towards their radio access networks (RANs) and will be using much bandwidth upon arrival. This is important because an unexpected network load may affect quality of experience for many of the NSP's other customers using that radio access network. Moreover, passengers in the HOV who have negotiated for network access from the HOV infrastructure during the voyage expect their bandwidth needs to be met and also expect high quality of experience (i.e., helpful services and notifications related to their connectivity).

Most of the existing solutions focus on addressing the radio coverage issue by building a device with multiple wireless wide area network interfaces, e.g., WiMAX+Satellite+GPRS on a train, besides the WiFi interface within the HOV. The existing bandwidth control and quality of service (QoS) solutions are limited to one type of wireless network. Prior solutions fail to deliver fully on wireless network bandwidth control and management for mobile passengers in HOV's. None of the solutions integrate expected passenger network usage via enhanced ticketing interactions, HOV routes, the relationship between route and Radio Access Network towers (e.g., base stations), real-time conditions or real-time bandwidth reservation requests. All of these factors are significant for both passenger quality of experience and to the Network Service Provider whose networks support the radio access portion of passenger communications.

SUMMARY OF THE INVENTION

Wireless communications to passengers travelling in high-occupancy vehicles can be improved on both the user experience side, and the Network Service Provider side with components and methods that allow a systematic interleaving and exploitation of factors not acted upon in the current art. As HOVs are essentially "bandwidth sinks" they are of interest to the NSP's that support the network but also to other service and content providers such as communication service providers and advertisers. The invention can be embodied in any type of HOV—we consider an HOV to be any vehicle that is carrying two or more passengers. Thus, the list of HOV types includes, but is not limited to: passenger buses, tour buses, ride-share cars, personal cars, shuttle cars and buses, taxis, trains and airplanes.

The present invention advantageously provides a system and method to manage wireless wide area network (WWAN) communications for HOV passengers having access to a mobile device of their own or fixed device installed in a vehicle with a wireless local area network (WLAN), e.g., WiFi (802.*), Bluetooth, etc. Typically this involves using the HOV operator's WWAN plan and accessing the Internet via a wireless "concentrator" on board the HOV with a WLAN interface. While the passenger's own WWAN plan may indeed include WLAN roaming capability, it may be costly or prohibitive for the passenger to rely on a state-wide or country-wide seamless coverage (indeed some plans, such as pre-pay, do not allow this) with sufficient capacity or a device with multiple radio interfaces for accessing more than one network. The HOV operator, on the other hand, may make state and country-wide coverage business deals, including service level agreements, with network service providers (NSPs or Mobile Virtual Network Operators (MVNO). While consumer wireless concentrator products now exist (e.g., for passenger vehicles), the integration of our inventive components and algorithms provides new non-obvious value to passengers, vehicle operators, and NSPs when these actors are all involved in the service ecosystem.

The inventive method comprises steps of creating a global bandwidth usage map across all vehicles, routes, and customers using data, transmitting the global bandwidth usage map to a HOV controller, interpreting the global bandwidth usage map and creating a local usage map, commanding a Bandwidth Controller in the NSP network to control the bandwidth for Base Stations (BSs) that serve the passenger devices in a HOV in accordance with the local usage map. Further, the global map can be created by gathering and fusing ticket and route information, obtaining or inferring customer network usage from productivity data found on a networked information source, and parsing obtained data into canonical form. Further, bandwidth reservation requests can be created from the fused information and forwarded to NSP's according to any policy that aims to improve passenger quality of experience. Further, the reservation requests can emerge from the fusion of NSP tower location, planned HOV locations, and real-time location and bandwidth requirements of a fleet of HOV's. A step of inputting information related to ticketing and anticipated in-route communications needs of a passenger and/or a ticketing agent can be included. A step of displaying messages to—or interacting in dialogs with—passengers via Short Message Service or via an application residing on the passenger's mobile device can be included.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIG. 3 shows exemplary tables for computing required bandwidth;

DETAILED DESCRIPTION OF THE INVENTION

The present invention advantageously provides a system and method to manage WWAN communications for passengers having access to a mobile device of their own or fixed device installed in a vehicle with a wireless local area network interface in an HOV.

Figure 1:
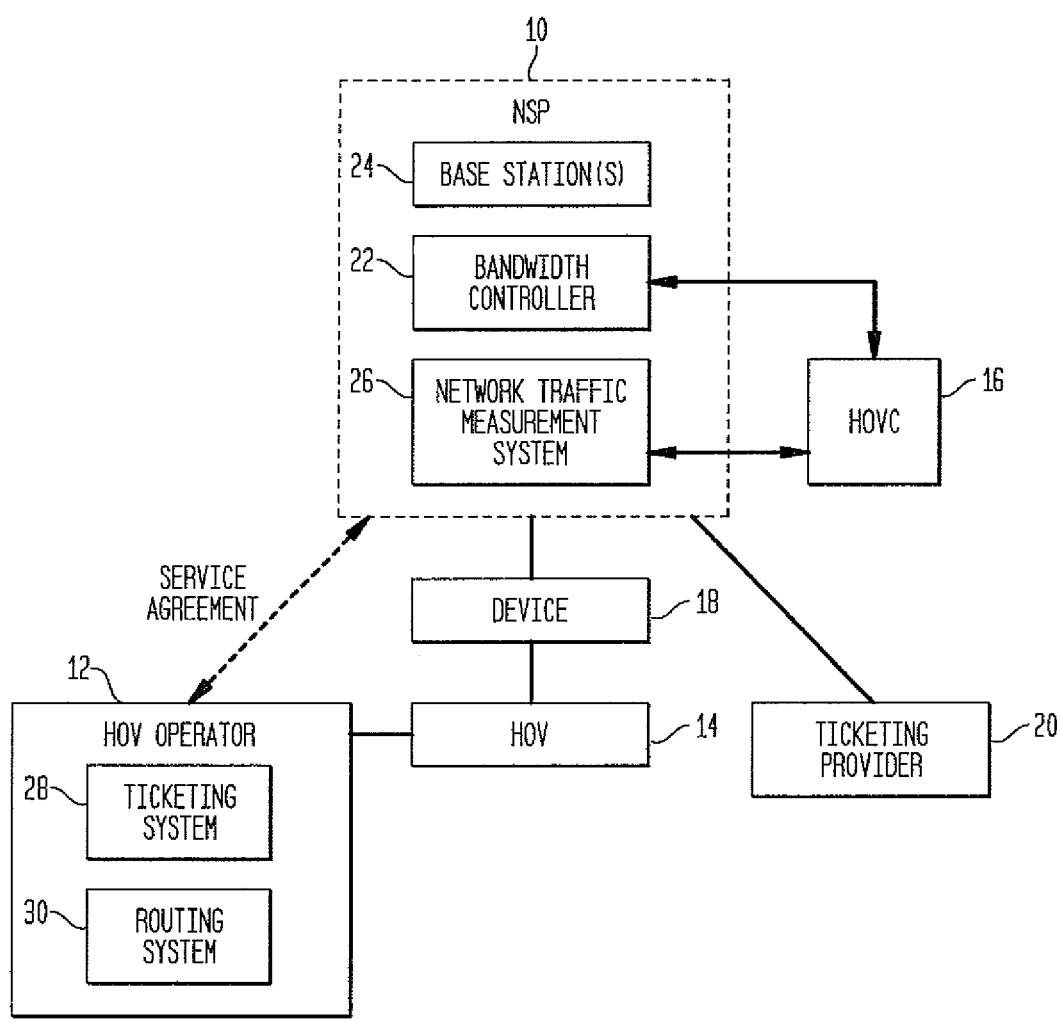
FIG. 1 illustrates the components of one embodiment of the system.

FIG. 1 illustrates an exemplary embodiment of the present invention. As shown in FIG. 1, the system comprises a network service provider (NSP) 10 network, a high occupancy vehicle (HOV) operator 12 system, an HOV 14, an HOV controller (HOVC) 16, a device 18, and a ticketing provider 20 system. Although only one of each component is shown, more than one of any or all of these components can be included in the system.

The NSP 10 owns or leases and manages one or more types of WWANs, e.g., 2.5G, 3G, 4G, across a relatively large physical space. Typically the NSP 10 has a business agreement with one or more HOV operators 12 who, in turn, may have agreements with one or more NSP 10. The NSP 10 has a Bandwidth Controller 22, which can interact with an HOV Controller (HOVC) 16 to control the bandwidth reserved for the base stations (BS) 24 that serve HOVs in the HOV routes. Bandwidth controller 22 is able to receive a spatiotemporal bandwidth map, that is, bandwidth requirements with time and location, and derive the set of BS's that are impacted. The NSP 10 also has a network traffic measurement system 26 that can transmit near-real-time traffic information to HOVC 16 upon demand, to compute bandwidth allocation for HOVs 14.

The HOV operator 12 runs the transportation service, offering WWAN wireless communications to passengers. Typically, an HOV operator 12 has business agreement with NSP 10 in which the latter provides network services. FIG. 1 shows Ticketing systems 28 and Routing systems 30 to track routes and HOV locations and progress within the HOV operator 12; however, these systems 28, 30 can be separate from and/or interworked with the HOV operator 12. HOV operators 12 may have large traditional fleets or small fleets with as few as one vehicle.

Passenger is an end-user who uses the network connectivity to operate a device 18, and, in most situations, passenger is charged by the HOV operator 12 for this privilege. Passenger can use his or her own device 18 or a borrowed device 18 so long as it has a wireless network adapter compatible with the type supporting the WLAN concentrator onboard the HOV. A Wireless Access Application (WAA), described below, may run on the device to facilitate, monitor, and customize connectivity to the in-vehicle network from the passenger's device.

Ticketing provider 20, possibly a third party entity, sells tickets to passengers for routes and collects information about passengers' expected network usage and other metadata. The collected information and metadata can be conveyed to other entities.

HOV 14 can be any sort of vehicle used to transport two or more passengers on any mode (e.g., land, sea, air). One embodiment can include a network traffic measurement system 26, an operations and support system controlled by NSP 10. The functionalities of the network traffic measurement system 26 can have programmatic interfaces and thus enable remote clients to read and exploit information stewarded there (e.g., network bandwidths, etc.)

To improve the coverage and bandwidth capacity issues, the inventive system consists of mechanisms for NSPs 10 or HOV operators 12 to plan and schedule bandwidth for HOVs 14 in the environment where the HOV routes may encompass areas with multiple types of available WWANs, allowing some passengers to pay service fees for better service quality using all networks with coverage and bandwidth.

Figure 2:
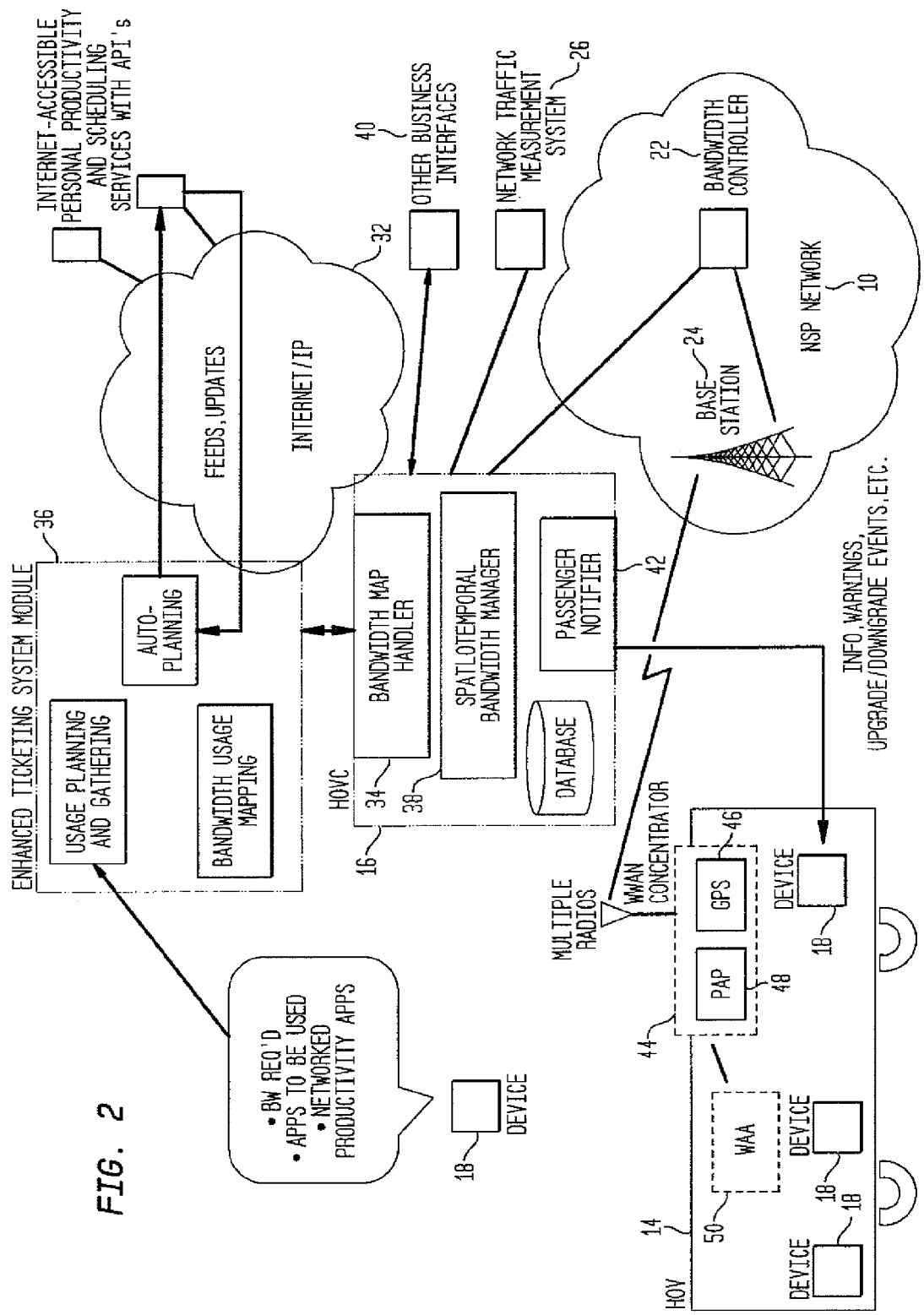
FIG. 2 illustrates the functional components of one embodiment of the system.

FIG. 2 illustrates functional components of the invention. The HOVC 16, which resides in an Internet or IP network 32, consists of three major functional components as follows. Bandwidth map-handler 34 receives and parses initial bandwidth map from the Enhanced Ticketing System Module 36 for a given HOV 14, route, and set of communication requirements 18. In addition, the bandwidth map-handler 34 receives and parses subsequent changes to its information and updates stale mappings as necessary.

Spatiotemporal bandwidth manager 38 performs a primary role of taking real-time network traffic from NSP's network traffic measurement system 26 and bandwidth maps (for various HOV routes) from the Enhanced Ticketing System 36, and computing a global model that describes the aggregate bandwidth requirements of all its HOVs across their routes over time. The relevant parts of this global map are then conveyed (at least in part) to the appropriate NSP bandwidth controllers 22 in order to convey the estimated bandwidth requirements of the HOV 14 in terms of locations. It may also convey the global map in whole or in part to other Business Interfaces 40, e.g., advertisers, other NSP's.

Passenger notifier 42 marshals and emits messages that passengers' devices 18 will receive, providing passengers with notifications related to their bandwidth availability for the duration of the voyage. These notifications can include warnings, downgrade situations, e.g., not enough bandwidth as planned for, upgrade situations, e.g., more bandwidth available to passenger than planned for, etc. Notifications might be delivered to the device 18 using any available transport, such as SMS, voice call, email, etc. Notifications may pulled by, pushed to, or appear in, the Wireless Access Application (WAA) 50 which executes upon the passenger device. Passenger notifier 42 may send dialog-type notifications to the passenger that demand a response from the passenger and keep state until all information is gathered.

WWAN Concentrator (WWANC) 44 resides in the HOV 14, has one or more WWAN radio interfaces, a GPS unit 46 to report location, software to route passenger data to available WWAN(s), software to interwork with HOVC 16 in the network, as well as WWAN interface to allow devices 18 to get an WWAN connection. A component of the WWANC 44 named the Passenger Access Point (PAP) 48 allows connectivity to the passenger devices 18 over a wireless link. The PAP 48 may interwork with network adapters on the passenger devices 18 and these communications may be facilitated and driven by an application on the device 18 called the WAA 50, described below. The WWANC 44 is configurable in various ways through network application interfaces and offline procedures.

Wireless Access Application (WAA) 50 is a software application that runs on a passenger's mobile device 18. WAA 50 can be installed on demand on the device 18 or can be pre-provisioned onto the device 18. WAA 50 may have a user interface (UI) visible to the user. The WAA UI shows the user his current status and may present notifications sent from the HOVC Passenger Notifier 42. The WAA 50 may be configured by the user to gather information from the passenger or to interwork with data stored on the passenger's device 18. This interworking may include the reading and uplinking of personal productivity information, such as scheduled calendar events and their details, to the HOVC 16, and the information can be encoded in an appropriate syntax and semantic understood by both the WAA 50 and the HOVC 16. WAA 50 may be configured by the provider of the WAA to react to events and messages from the WWANC 44 and/or the HOVC 16. In this regard, either of those entities may trigger reminders, advertisements, and/or information that the user will find helpful. The WAA UI can display these items in an appropriate fashion.

The Bandwidth Controller 22 resides in the NSP network 10. Software components can interact with HOVC 16 to control the bandwidth reserved for HOVs 14 for the BSs 24 the HOVs traverse in near-real-time. Note that the Bandwidth Controller 22 may be used for other purposes, such as reserving bandwidth for priority services.

Enhanced Ticketing System (ETS) 36 functional component resides in the Internet network 32, and may be associated with an existing ticketing system. ETS 36 is provided with passenger communications requirements and maps them into bandwidth requirements. It also has the capability to connect to Internet-based scheduling systems for given passengers to, in part, determine communications needs for the duration of the voyage in question on an automatic or semi-automatic basis. In addition, if changes to a passenger's external scheduling systems occur after ticket purchase, the ETS will receive or pull this information and communicate it accordingly to the HOVC 16 who responds by updating its state and taking necessary actions.

Figure 4:
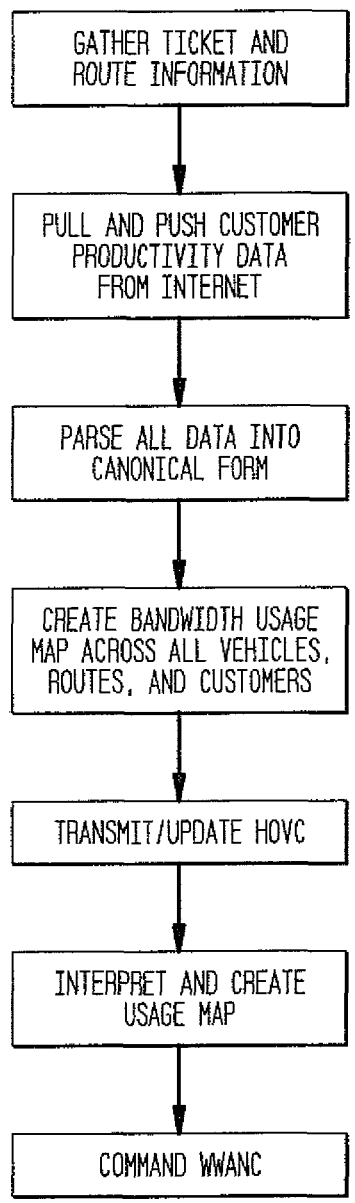
FIG. 4 is a flow diagram of an embodiment of the inventive method.

FIG. 4 is a flow diagram of an embodiment of the inventive method. Steps S1 thru S5 can be performed by Enhanced Ticket Module System 36. In step S1, ticket and route information is gathered from customers and vehicle operators. In step S2, customer data, such as productivity data, calendar information, etc., is obtained. This data can be pushed and/or pulled from the internet and/or other networked sources. In step S3, the data from step S2 is parsed into canonical form. In step S4, a bandwidth usage map is created across all vehicles, routes, and customers. This process is discussed in main cases below. In step S5, the HOVC 16 is updated in accordance with the bandwidth usage map.

In step S6, the HOVC 16 interprets and creates a usage map by joining the information found in route, bandwidth usage, and capacity estimation tables. In step S7, the HOVC 16 commands the WWANC 44.

Operation of the system is presented in accordance with the following main cases and flow diagrams.

Pre-Trip/Estimation:

Before the trip of a passenger begins, the HOV bandwidth planning mechanism provides an estimated bandwidth for the connection of a passenger's device 18 along his/her route based on the policies on ticketing information, route information, passenger profile, and network traffic statistics data in accordance with the following. The passenger selects the levels of bandwidth that he may need during the trip either explicitly or by indicating the types of applications that will be used, and when. A mapping component may map these applications into network requirements. For example, the passenger may indicate expected use of voice calls, Web Browsing, video conferencing, or any other bandwidth-consuming communications application, during certain times.

In addition, the passenger may provide the system with a network accessible endpoint to query in order to retrieve the schedule of application-use or other calendar or task information, e.g. a Google Calendar RSS feed. From this information a mapping component may infer the expected bandwidth requirements of the passenger as a function of time of day and the location of the HOV. In lieu of detailed planning information, the passenger may provide the system with only a "profile" in plain text, e.g., "I will be a power-user on this trip" or "I will check email intermittently", etc., and this will be mapped to communications requirements.

These estimation activities may be synchronized with the ticket purchasing process. For example, an additional Web form, e.g., a pop-up, may appear when buying a ticket online, or a ticket agent may ask questions of a passenger over the phone or in person. In addition, ticket purchasing may reflect different levels of tickets which "guarantee" more or less bandwidth to the passenger, e.g., the connectivity may be bundled with other services paid for by the user.

As new passengers buy tickets from ticketing systems at any time once the HOV has begun its voyage, a synchronization occurs between the invention components on the ticketing side and those on the HOV itself For example, as a bus approaches a destination, new passengers may buy tickets and wait to board. Information about these new passengers and their devices is synchronized with the components soon as possible. Thus the HOVC component is always aware of the passenger requirements and updates its own internal state in a timely fashion to reflect the requirements. The result is that the system's components have an accurate and machine readable representation of the passenger devices' expected network usage.

Alerting Passengers During a Voyage

During the trip, the HOVC components alert individual passengers through their devices regarding bandwidth increase, decrease, or loss in real-time. Passengers can be pre-warned or notified about potential bandwidth shortages. This may occur via SMS, e-mail, or voice call. HOVC 16 achieves this by interworking with the Network traffic measurement system 26, and analyzing required bandwidth measures as compared to available bandwidth. The required bandwidth is inferred by several mappings from passengers' application usage, scheduled events, e.g. telecons and so on. HOVC can use various tables to assist with the computation of the compute required bandwidth. FIG. 4 shows exemplary tables.

When a given passenger on a given HOV 14 will be unable to acquire and use the bandwidth he requires, he is notified. In one embodiment, an HOVC 16 message to ticketing comprises a RAINCHECK message which is valid for the duration of trip and subsequent trips. With a RAINCHECK in effect, the passenger may get additional free bandwidth when it is in surplus later in the trip or free connectivity on the next trip.

When a surplus of bandwidth is available, HOVC components let the passenger know and provide link-backs to ticketing and billing so that the passenger can "purchase" more bandwidth if required, or be allocated this bandwidth. This may entail a re-adjustment by the WWANC 44 to ensure that a particular passenger's network traffic to and from the vehicle uses the appropriate radio networks 24 and reflects the business situation.

Pulling from Internet Sources

During the voyage, the HOVC 16 continues to pull data from the Internet 32 that helps the HOVC determine bandwidth usage. Principally HOVC 16 pulls scheduled information from calendars via Web API's, reads the calendar event and determines if network usage is implied. This is done by examining the time of the event, e.g. start time should be during the voyage of the passenger on the HOV 14, and possibly the subject and description of the event, looking for keywords and otherwise parsing the meaning (via any Natural language method). For example, if a calendar event for passenger P indicates, "Telecon with Jim, 5 p-6 p today" and P is scheduled to be in route on the HOV 14 during 4-7 pm then the HOVC 16 can assume connectivity will be required for P from 5-6 pm at least, and will comprise a voice call, so that HOVC 16 infers P's bitrate requirements for this time period.

Passenger network usage, either when entered by a passenger or when inferred, is taken as a "rough estimate" and HOVC 16 provides the user with the chance to clarify or correct the inferred information via an interactive pop-up window, via SMS entry (with response expected), and so on.

Bandwidth Control Interworking with Bandwidth Controller and Network Traffic Measurement System Because the HOV operator 12 has a business agreement with NSPs 10, it is important to collect network traffic information from the NSPs' Network Traffic Measurement System 26 and inform the NSPs' Bandwidth Controller 22 of progress and information relating to bandwidth requirements to control the bandwidth allocation for HOVs 14 in BSs 24 along the HOV routes. During the route, the HOV bandwidth control mechanism allocates the reserved bandwidth for HOVs for the BS(s) 24 the HOVs traverses in near-real-time based on scheduled events, e.g., from the passenger calendar (local or networked), and un-scheduled events, e.g., traffic jams.

After receiving the bandwidth allocation updates from the HOVC, the Bandwidth Controller 22 transmits updated "radio bandwidth reservation quota" for individual (or collective depending on the policies) HOV operators 12. The "radio bandwidth reservation quota" is used by the BSs 24 to adjust the percent of radio bandwidth reserved for the HOV(s) compared to other public users. The BSs 24 will check the quota in doing the admission and QoS control.

The HOV bandwidth control mechanism also handles the load balancing for HOV passengers in the overlapped coverage area among multiple types of wireless networks automatically based on network load measurements, real-time road conditions and other data. Load balancing can be achieved by the HOV binding to one or more networks, e.g., 2.5G/3G/4G or a supplemental WiFi hotspot when HOV is stopped or slow moving, etc. The choice of which networks to use is critical and the system allows any policy to be the decision point here.

Using Route Semantics

During the voyage or route, the HOV bandwidth control mechanism reacts to changes in HOV progress along the route, e.g., HOV getting stuck in traffic jams, HOV stopping in a rest area, passengers getting on or off the HOV, and uses the knowledge to re-assess the ability to deliver bandwidth to individual riders. The HOVC components can compare current location of the HOV to expected location, or current speed to expected speed, and if there is a variation, infer a change in scheduling. HOVC would then compute the impact of this change. For example, for an HOV "stuck in traffic", the impact on the surrounding networks will be high if the cumulative bandwidth of the passengers is high. Similarly, if the HOV is ahead of schedule, the NSP or Network Operator wants to know if the high-impact network usage will occur earlier than usual. Thus the HOVC determines, from the environmental and geospatial data at hand, if HOV is going to impact a set of RAN's in way that was not expected by the Network Operator or that exceeds some previously set up quantitative thresholds.

Route semantics such as "rest stops" and "station stops" are PLANNED stops and can be used to advantage if conveyed to NSP's Network traffic measurement system. Hence the HOVC gathers and aggregates these planned stops, using, for example, the Tables in FIG. 3, and conveys the impact to Network traffic measurement system. In this way, the Network traffic measurement system can plan to make more bandwidth available at rest-stop regions since it is here that the HOV will remain for a longer time, increasing the chances of heavy usage. Similar logic applies for station, e.g., bus stop, pickups. HOVC compares the availability of bandwidth across the entire route of the HOV. If there are regions with very little coverage, then the information is uplinked to Ticketing so that customers can be aware of this constraint. HOVC can also prepare alert messages to warn users that these areas are low bandwidth and their connections may be downgraded during presence in these regions. These messages may be delivered via WAA 50 or via another channel.

Using Passenger and Location Semantics

During the route or trip, the HOV location service mechanism enables HOV operators to direct broadcast/multicast location-based advertisements (with bandwidth requirements) to the mobile devices 18, e.g. laptop computers, smart phones, MIDs, etc., of HOV passengers and/or to in-vehicle display, and/or to the exterior display of the HOV for display in urban areas along the route. Note that where the HOV moves slowly, more pedestrians may be available to watch. In this case a central server may be kept in sync by messages from the HOV regarding its location, passenger profiles, etc., and the central server may respond at certain times with information destined for the HOV or for individual passengers on the HOV. As an example, as an HOV passes an amusement park (clearly visible from the windows of the HOV) the HOVC components and the advertising systems may interwork to send an ad for the park to the screens of the mobile devices of passengers.

Usage: Broadcasting Mobile Traffic to Network Service Providers

In an optional use case, the system could broadcast the dynamic motions and bandwidth requirements of the HOV to subscribing NSPs. In one embodiment the HOVC 16 uses the application interfaces supplied by the NSP Network 10 to convey this information in canonical form. They want to know about impending traffic on their networks and have Network traffic measurement systems 26 that automatically react. The knowledge that a large number of roaming users are about to enter their networks is valuable.

Usage: HOVC Traffic Routing for Multi-Radio Scenario

In this use case, a series of passengers require network connectivity from a single vehicle. The HOVC 16 may be aware of this in advance, perhaps via Enhanced Ticketing system 36, and configures the WWANC 44 using a configuration interface in either an offline or online/real-time mode. The post-condition is that the WWANC 44 is seeded with the configurations that dictate how passenger network traffic should be allocated between the multiple radios. During subsequent usage of the networking services by passengers, the WWANC 44 is able to filter and direct passenger connections to the WAN via one or more particular radios/networks. In one embodiment, this is achieved by keeping a map that relates the passenger devices to the wide area Radio access networks they should use. When packets arrive at the WWANC 44 they are identified and mapped to the appropriate network adapter and transmitted on the Radio network. In this way, WWANC 44 can exploit the multiple networks currently available to it in parallel in order to serve communications to its passengers.

Usage: Device Wireless Access Application (WAA)

In this use case, the passenger mobile device 18 with which WAN connections will be made is running the Wireless Access Application (WAA) 50, a custom application that facilitates communications. Through the WAA UI, the passenger instructs the device to attach to the PAP 48 in the vehicle. Upon connection, the UI responds with terms of service or other options available to the user as well as a confirmation of the passengers' bandwidth requirements (gathered previously or inputted). As the vehicle continues on route and the passengers input new productivity information, the WAA detects a change in the device data, and immediately forms and sends a message to HOVC containing the new data. HOVC reacts by adjusting its model of the HOV's bandwidth requirements. HOVC may respond by sending a message to the passenger via WWANC and WAA informing the user that the new appointment that she just made, which, for example, implied additional bandwidth requirement, could not likely be met, or could be met for an additional cost. The WAA presents a series of options and billing scenarios and the passenger chooses one.

Figure 5:
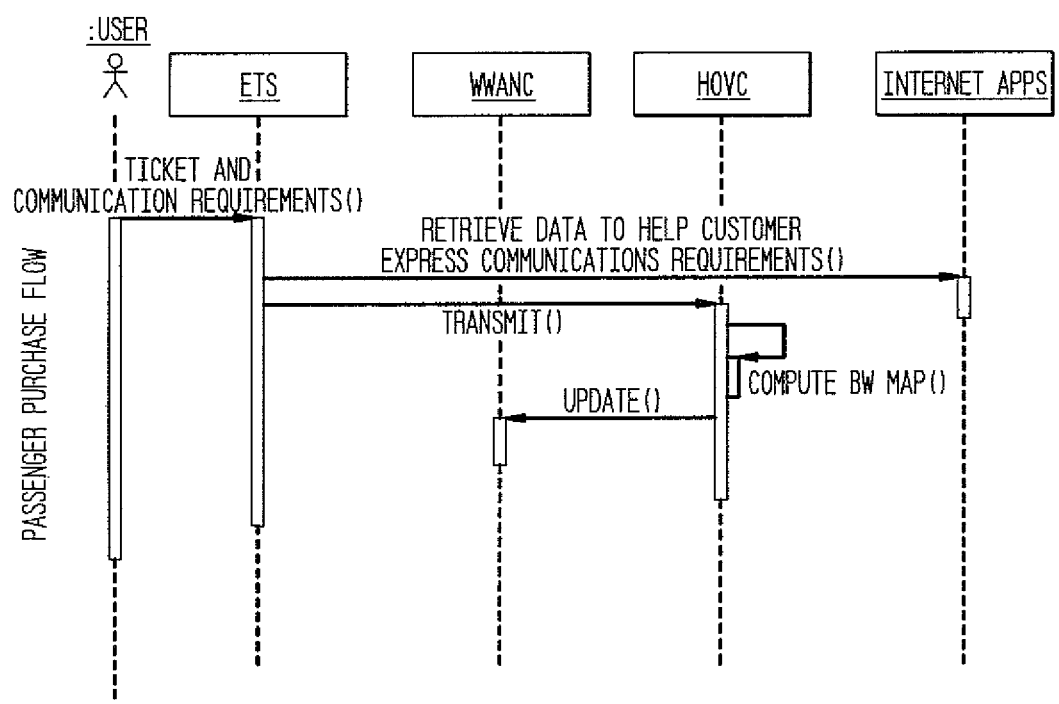
FIG. 5 illustrates an initial portion of the invention flow.

FIG. 5 illustrates the invention flow starting from the customer negotiating a ticket at the Enhanced Ticketing System (ETS) 36 or some proxy to that. The passenger indicates his communication requirements as part of the negotiation. Passenger may also provide links to Internet-based productivity applications (Apps) that steward data that can be used to infer communications requirements. For example, an Internet service describing a scheduled phone call, e.g., using Voice over IP, to the user may imply the requirement for a 64 kbs channel to the user between the start and end time of the scheduled call. At some time after negotiation, the ETS 36 conveys the communications requirements of the passenger to the HOVC 16 in a canonical form. HOVC 16 does further aggregation (across all customers and routes) and updates its bandwidth maps. It then determines which WWANC entities, e.g., which vehicles, need to be updated with the requirements and transmits them in a canonical form.

Figure 6:
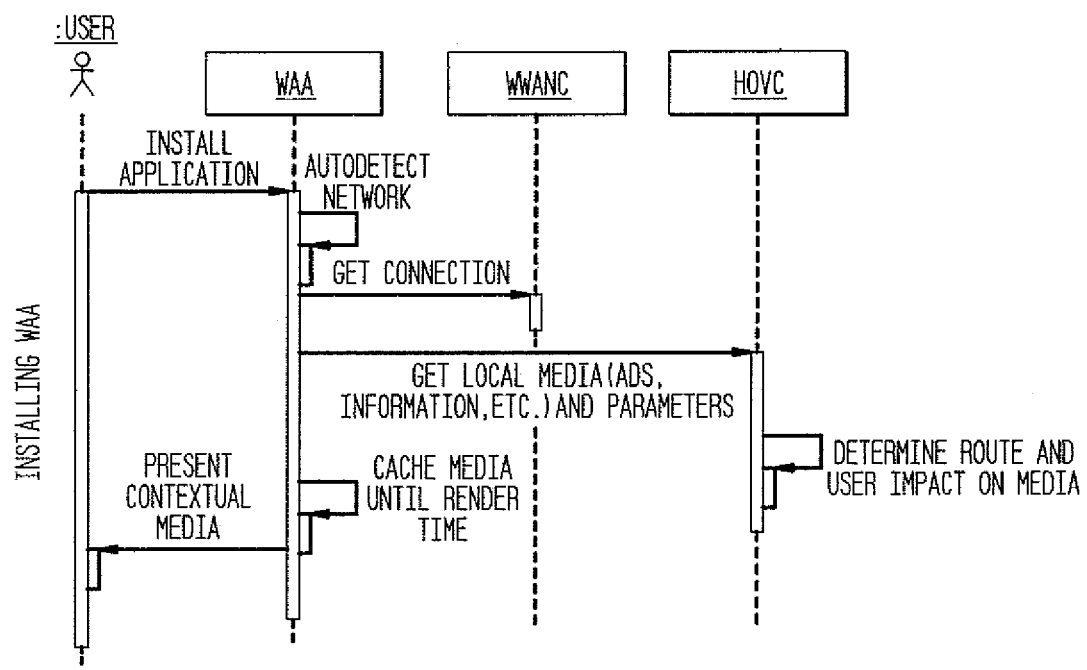
FIG. 6 illustrates the invention flow with respect to the WAA.

FIG. 6 shows the flows surrounding the Wireless Access Application (WAA) 50. WAA is installed onto the mobile device 18 that the passenger uses to access the wide area network; the installation may occur in an offline step, at time of vehicle boarding, etc. The WAA 50 provides User Interface (UI) through which messages and dialogs intended for the passenger can be rendered. The WAA auto-detects the local in-vehicle network and gets a connection. It then may message with the HOVC 16 to ask for a series of media, such as advertisements and information, that can be displayed to the user at a particular rate, time, and/or place. For example, an image file comprising an ad for a theme park might be rendered by the WAA 50 at the moment the HOV 14 is passing that same theme park.

Figure 7:
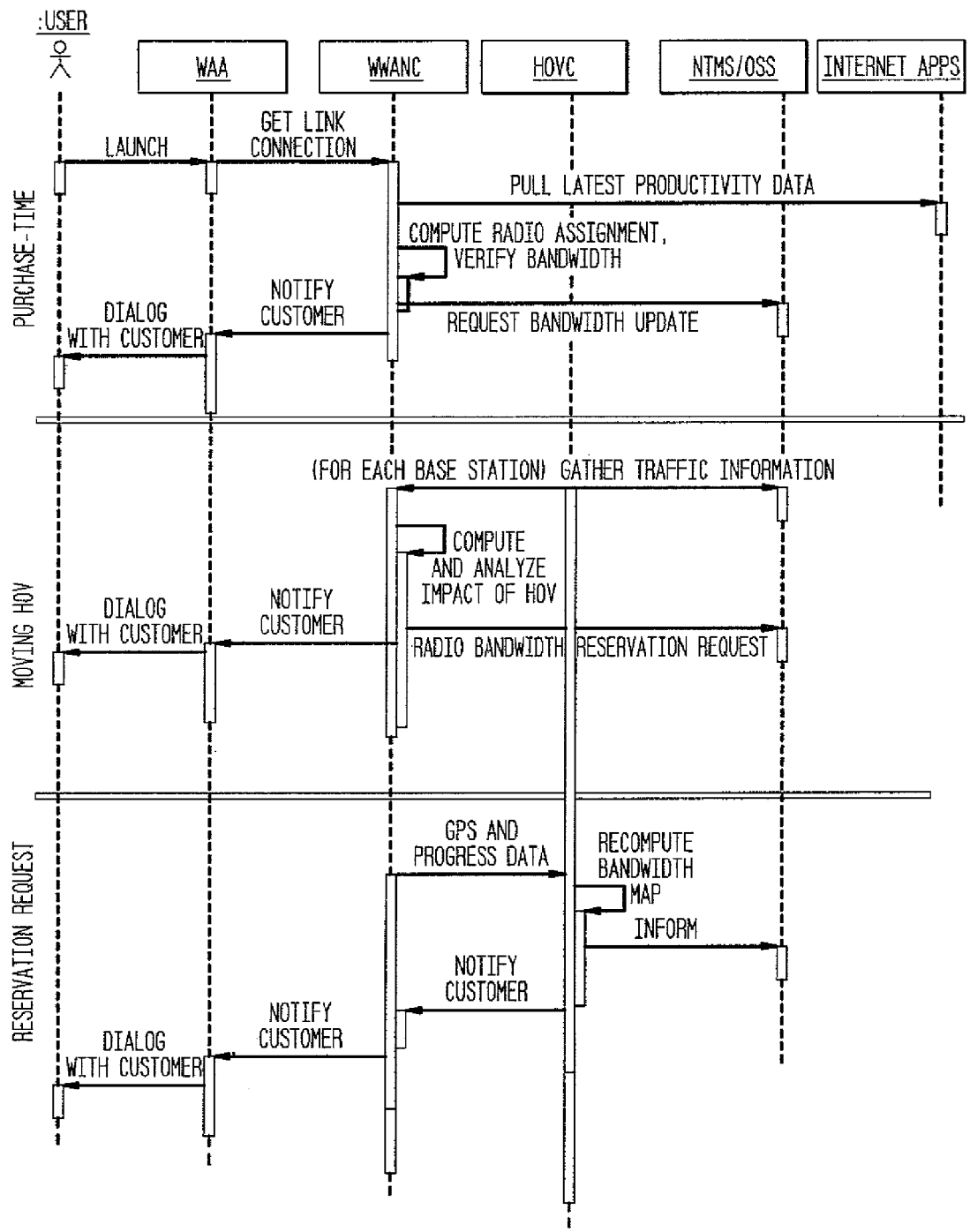
FIG. 7 illustrates additional invention flows.

FIG. 7 shows multiple flows. At ticket purchase time, or "initialization"-time, the aggregated bandwidth map for a given WWANC/vehicle is used to reserve Radio bandwidth at the Operations Support System or Network Traffic Monitoring System 26. The passenger may be informed of the resulting dearth or surplus of network bandwidth with regards to her own requirements for the journey. While the HOV 14 is in motion, the WWANC 44 or HOVC 16 may look ahead and attempt to reserve bandwidth on the Radios that will be serving the route ahead.

Similarly, the WWANC 44 may intermittently update the HOVC 16 with its location. This location can be determined using the GPS receiver 46 in the housing of the WWANC 44. In this way the HOVC 16 can correlate the HOV 14 to where it SHOULD be at the given moment, given the route schedule. The HOVC 16 can also propagate this information about current and expected future whereabouts and bandwidth requirements to the NSPs 10 through network application program interfaces (API).

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A system for managing wireless communications for a plurality of devices in a high occupancy vehicle, comprising:
a network provider;
a high occupancy vehicle controller for creating a global bandwidth usage map across multiple vehicles, routes, and vehicle passengers using communications bandwidth;
an enhanced ticketing system module having ticketing information regarding the device, said ticketing information input by one of the user, and a ticketing agent, and said ticketing information is the basis for the creation of a formal representation of estimated bandwidth requirements as a function of both place and time relative to the HOV route schedule;
a wireless concentrator in the high occupancy vehicle; and
a vehicle controller estimating bandwidth usage for one device of the plurality of devices, said estimating performed using said global bandwidth usage map and information from said network provider, wherein when a user of said one device is in said vehicle, said wireless concentrator manages the wireless communications for said device;
wherein said high occupancy vehicle controller is connected to said enhanced ticketing system module to gather ticket and route information and obtain customer productivity data from a network; and parse obtained data into canonical form, and to input ticketing information by one of the user and a ticketing agent.

2. The system according to claim 1, further comprising a wireless access application residing on the device and displaying messages from the vehicle controller, network provider and the enhanced ticketing system module in one-way or two-way dialog-style interactions in which updated passenger preferences or services may be gathered.

3. The system according to claim 2, wherein the messages are notifications of changes in available bandwidth.

4. The system according to claim 1, wherein said estimating is performed further using dynamic ticket, route, vehicle progress, and network traffic information.

5. The system according to claim 1, wherein said estimating is performed further using customer productivity data from said network provider, and said customer productivity data is parsed into canonical form.

6. A method for managing wireless communications for a plurality of devices in a high occupancy vehicle, comprising steps of:
creating a global bandwidth usage map across all vehicles, routes, and customers using data;
transmitting said global bandwidth usage map to a vehicle controller;
interpreting said global bandwidth usage map and creating a local usage map;
commanding a wireless concentrator to manage the wireless communications for said devices in accordance with the local usage map; and
interworking with network resources to understand bandwidth availability, notify of future usage, or request a reservation of bandwidth;
said step of creating further comprising:
gathering ticket and route information;
obtaining customer productivity data from a network;
parsing obtained data into canonical form, and
inputting ticketing information by one of the user, and a ticketing agent.

7. The method according to claim 6, further comprising a step of displaying messages and interactive dialogs from a network provider and the ticketing information, said displaying performed by a wireless access application residing on the device.

8. The method according to claim 7, wherein the messages are notifications of changes in available bandwidth.

9. The method according to claim 6, wherein said step of creating is performed further using dynamic ticket, route, vehicle progress, and network traffic information.

10. A non-transitory computer readable medium having computer readable program for operating on a computer for managing wireless communications for a plurality of devices in a high occupancy vehicle, said program comprising instructions that cause the computer to perform the steps of:
creating a global bandwidth usage map across all vehicles, routes, and customers using data;
transmitting said global bandwidth usage map to a vehicle controller;
interpreting said global bandwidth usage map and creating a local usage map;
commanding a wireless concentrator to manage the wireless communications for said devices in accordance with the local usage map; and
interworking with network resources to understand bandwidth availability, notify of future usage, or request a reservation of bandwidth,
said step of creating further comprising:
gathering ticket and route information;
obtaining customer productivity data from a network;
parsing obtained data into canonical form, and
inputting ticketing information by one of the user, and a ticketing agent.

11. The non-transitory computer readable medium having a computer readable program according to claim 10, further comprising a step of displaying messages and interactive dialogs from a network provider and the ticketing information, said displaying performed by a wireless access application residing on the device.

12. The non-transitory computer readable medium having a computer readable program according to claim 11, wherein the messages are notifications of changes in available bandwidth.

13. The non-transitory computer readable medium having a computer readable program according to claim 10, wherein said step of creating a global bandwidth map is performed further using dynamic ticket, route, vehicle progress and network traffic statistics.

14. The non-transitory computer readable medium having a computer readable program according to claim 10, wherein an application deployed to one of said plurality of devices may auto-detect, auto-connect, manage, and convey information and notifications regarding said one device's communications situation on-board the vehicle.

* * * * *

UNITED STATES PATENT AND TRADEMARK OFFICE
CERTIFICATE OF CORRECTION

| | | |
|---|---|---|
| PATENT NO. | : 8,488,522 B2 | Page 1 of 1 |
| APPLICATION NO. | : 12/437458 | |
| DATED | : July 16, 2013 | |
| INVENTOR(S) | : Falchuk et al. | |

It is certified that error appears in the above-identified patent and that said Letters Patent is hereby corrected as shown below:

In the Drawings

In Fig. 2, Sheet 2 of 7, for Tag "38", in Line 1, delete "SPATLOTEMPORAL" and insert -- SPATIOTEMPORAL --, therefor.

In the Specification

In Column 1, Lines 31-32, delete "EVDO/UMTS/HSDA," and insert -- EVDO/UMTS/HSDPA, --, therefor.

In Column 2, Line 28, delete "trains" and insert -- trains, --, therefor.

In Column 2, Line 38, delete "WLAN" and insert -- WWAN --, therefor.

In Column 4, Lines 40-41, delete "requirements 18." and insert -- requirements. --, therefor.

In Column 6, Line 44, delete "itself" and insert -- itself. --, therefor.

In Column 7, Line 15, delete "networks 24" and insert -- networks --, therefor.

In Column 7, Line 39, delete "Control" and insert -- Control: --, therefor.

In Column 8, Line 27, delete "aggregrates" and insert -- aggregates --, therefor.

In Column 10, Line 24, delete "SHOULD" and insert -- should --, therefor.

Signed and Sealed this
Twenty-first Day of October, 2014

Michelle K. Lee
*Deputy Director of the United States Patent and Trademark Office*